US008572596B2

(12) United States Patent
Stoodley et al.

(10) Patent No.: US 8,572,596 B2
(45) Date of Patent: *Oct. 29, 2013

(54) RUNTIME CODE MODIFICATION IN A MULTI-THREADED ENVIRONMENT

(75) Inventors: Kevin Alexander Stoodley, Richmond Hill (CA); Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1554 days.

This patent is subject to a terminal disclaimer.

(21) Appl. No.: 11/842,419

(22) Filed: Aug. 21, 2007

(65) Prior Publication Data

US 2008/0052725 A1    Feb. 28, 2008

(30) Foreign Application Priority Data

Aug. 28, 2006    (CA) .................................. 2557343

(51) Int. Cl.
    *G06F 9/45* (2006.01)
(52) U.S. Cl.
    USPC ......................................................... 717/159
(58) Field of Classification Search
    None
    See application file for complete search history.

(56) References Cited

U.S. PATENT DOCUMENTS

| 5,923,883 | A * | 7/1999 | Tanaka et al. ................. 717/156 |
| 6,173,442 | B1 * | 1/2001 | Agesen et al. ................. 717/141 |
| 6,704,923 | B1 * | 3/2004 | Gosling ......................... 717/126 |
| 6,738,967 | B1 * | 5/2004 | Radigan ......................... 717/146 |
| 7,289,508 | B1 * | 10/2007 | Greene ......................... 370/394 |
| 7,328,242 | B1 * | 2/2008 | McCarthy et al. ............ 709/204 |
| 7,734,958 | B1 * | 6/2010 | Di Fabbrizio et al. ..... 714/38.14 |
| 7,788,314 | B2 * | 8/2010 | Holt ............................... 709/201 |
| 2001/0018701 | A1 * | 8/2001 | LiVecchi ....................... 709/105 |
| 2002/0029239 | A1 * | 3/2002 | Sullivan et al. ............... 709/104 |
| 2002/0104077 | A1 * | 8/2002 | Charnell et al. .............. 717/162 |
| 2002/0166016 | A1 * | 11/2002 | Stoodley et al. .............. 710/200 |
| 2003/0041163 | A1 * | 2/2003 | Rhoades et al. .............. 709/232 |
| 2003/0074390 | A1 * | 4/2003 | Hudson ......................... 709/108 |
| 2003/0093256 | A1 * | 5/2003 | Cavanagh et al. ............. 703/14 |

(Continued)

FOREIGN PATENT DOCUMENTS

JP    11338699 A    10/1999

OTHER PUBLICATIONS

Kevin A. Stoodley et al., "Runtime Code Modification in a Multi-Threaded Environment", Canadian Patent Application 2,557,343. Office Action, Canadian Intellectual Property Office. May 9, 2012. 4 pages.

(Continued)

*Primary Examiner* — Wei Zhen
*Assistant Examiner* — Adam R Banes
(74) *Attorney, Agent, or Firm* — Marcia L. Doubet

(57) ABSTRACT

A code region forming part of a computer program is modified during execution of the computer program by a plurality of threads. In one aspect, identical modification instructions are provided to each thread for modifying a site in the code region having a desirable idempotent atomic modification, and the modification instructions direct each thread to make the desirable idempotent atomic modification. In another aspect, a thread is selected to modify the code region, each thread other than the selected thread is directed to execute an alternative execution path that generates output identical to the output of the code region after the code region has been modified, and, responsive to directing each thread other than the selected thread, the selected thread is directed to modify the code region.

13 Claims, 4 Drawing Sheets

(56) References Cited

U.S. PATENT DOCUMENTS

| | | | |
|---|---|---|---|
| 2003/0236816 A1* | 12/2003 | Venkatasubramanian | 709/107 |
| 2006/0101468 A1* | 5/2006 | Massarenti et al. | 718/102 |
| 2006/0136867 A1* | 6/2006 | Schneider et al. | 717/106 |
| 2006/0248515 A1* | 11/2006 | Qadeer et al. | 717/127 |
| 2006/0265704 A1* | 11/2006 | Holt | 717/169 |
| 2007/0011627 A1* | 1/2007 | Dennison et al. | 716/1 |
| 2007/0050682 A1* | 3/2007 | Takuma et al. | 714/45 |
| 2007/0078816 A1* | 4/2007 | Stern et al. | 707/2 |
| 2007/0113223 A1* | 5/2007 | Ludwig et al. | 717/161 |
| 2007/0169031 A1* | 7/2007 | Harris | 717/140 |
| 2007/0169085 A1* | 7/2007 | Griep | 717/168 |
| 2007/0180440 A1* | 8/2007 | Pechanek | 717/159 |
| 2007/0226705 A1* | 9/2007 | Lomet | 717/133 |
| 2007/0240158 A1* | 10/2007 | Chaudhry et al. | 718/102 |
| 2008/0005737 A1* | 1/2008 | Saha et al. | 718/100 |
| 2008/0016507 A1* | 1/2008 | Thomas et al. | 718/100 |
| 2008/0052498 A1 | 2/2008 | Stoodley et al. | |
| 2008/0052697 A1 | 2/2008 | Stoodley et al. | |
| 2008/0301655 A1* | 12/2008 | Gulwani et al. | 717/156 |
| 2009/0235034 A1* | 9/2009 | Holt | 711/150 |

OTHER PUBLICATIONS

Kevin A. Stoodley et al., U.S. Appl. No. 11/842,260, filed Aug. 21, 2007, Office Action, Feb. 18, 2011, 45 pages.

Kevin A. Stoodley et al., U.S. Appl. No. 11/842,260, filed Aug. 21, 2007, Final Office Action, Jul. 21, 2011, 37 pages.

Kevin A. Stoodley et al., U.S. Appl. No. 11/842,360, filed Aug. 21, 2007, Office Action, Feb. 18, 2011, 41 pages.

Kevin A. Stoodley et al., U.S. Appl. No. 11/842,360, filed Aug. 21, 2007, Final Office Action, Jul. 21, 2011, 34 pages.

* cited by examiner

RUNTIME CODE MODIFICATION IN A MULTI-THREADED ENVIRONMENT

CROSS-REFERENCE TO RELATED APPLICATIONS

A claim for foreign priority is made based on application 2557343 filed in Canada on Aug. 28, 2006. The present invention is related to the following commonly-assigned U.S. patent applications, all of which are filed concurrently herewith: U.S. Ser. No. 11/842,260 entitled "RUNTIME CODE MODIFICATION IN A MULTI-THREADED ENVIRONMENT" and U.S. Ser. No. 11/842,360 entitled "RUNTIME CODE MODIFICATION IN A MULTI-THREADED ENVIRONMENT".

BACKGROUND OF THE INVENTION

The present invention relates to multithreaded computer programs, and more particularly to the modification of such computer programs during execution.

Many modern computer programs are "multi-threaded", that is, the computer program is split into a plurality of simultaneously executing, or virtually simultaneously executing, tasks or "threads". In the case of a computer system having a plurality of processors, the various threads may actually execute simultaneously. In the case of a computer system having a single processor, the threads will typically be executed sequentially by the processor, with the switching between the threads being so fast as to be virtually simultaneous. While such threads typically execute independently of one another, they usually share resources such as memory.

In many instances, it is necessary or desirable for certain portions of the computer program code to be modified while the code is being executed by the computer system. In a multithreaded context, such modification presents a number of difficulties.

One problem associated with such modification is that because the threads share resources, where more than one thread attempts to modify a section of code at the same (or substantially the same) time, problems can be introduced into the code. For example, a second thread may begin modifying the code section before a first thread has completed its modifications, so that the resulting code no longer produces the desired results. When such undesired interactions between threads occur, the situation is said not to be "thread safe"; conversely, when such interactions are prevented, the code is "thread safe".

Conventionally, there have been two main approaches used to avoid the problems associated with multiple threads attempting to modify the same section of code at the same time.

The first approach is to use a "lock" to synchronize access to the section of code so that all threads other than the thread that is modifying the section of code are prevented from executing until the modification is complete. This approach, understandably, will usually degrade the performance of the computer program.

The second approach is to direct all threads, other than the thread that is modifying the section of code, to a "spin loop" until the modification is complete. A "spin loop" is a section of code which causes the threads to carry out pointless programming tasks, that do not advance any of the objectives of the computer program, until the modifications are complete. The threads in the spin loop are in essence "spinning their wheels", also known as "busy waiting", while they wait for the relevant thread to finish modifying the code. The use of spin loops can lead to "live lock" situations, where a higher priority thread is trapped in the spin loop and is unable to escape because a lower priority thread is modifying the code. As a result, the program can seize or "hang" such that it is unable to proceed with further productive execution.

Accordingly, it is desirable to provide a technique by which sections of computer code can be modified during execution in a multithreaded environment, without resorting to locks or spin loops.

BRIEF SUMMARY OF THE INVENTION

The invention may be embodied as a computer program product having a computer-usable medium embodying computer-usable program code for making a desirable idempotent atomic modification to a site in a computer program code region during execution of the computer program by a plurality of threads. The computer-usable program code provides identical modification instructions to each thread. The modification instructions direct each thread to make the desirable idempotent atomic modification.

The invention may also be embodied as a computer program product for making a desired modification to a code region forming part of a computer program during execution of the computer program by a plurality of threads. The computer program product includes a computer-usable medium having computer-usable program code embodied therewith. The embodied code is configured to select a thread to modify the code region to form a modified code region, direct each thread other than the selected thread to follow an alternative execution path that generates output identical to the output of the code region after the modification has been made, and, responsive to directing each thread other than the selected thread, to direct the selected thread to make the modification to the code region so as to generate the modified code region.

The invention may also be embodied as a computer program product having a computer-usable medium embodying computer-usable program code for making a desirable modification to a computer program code region during execution of the computer program by a plurality of threads. Program product code selects a thread and directs each thread other than the selected thread to follow an alternative execution path that generates output identical to output of the code region after the desirable modification has been made to the code region. The computer program product includes other program code that responds to the directions to the non-selected threads by directing the selected thread to make the desirable modification to the code region.

Further, the invention may be embodied as a computer program product having at least one computer-usable medium containing program product code for causing a desirable idempotent atomic modification to be made to a code region in a computer program during execution of that computer program by a plurality of threads. The computer program product code includes a call to a set of modification instructions. Each thread reaching the call makes the desirable idempotent atomic modification.

BRIEF DESCRIPTION OF THE SEVERAL VIEWS OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE INVENTION

Figure 1:
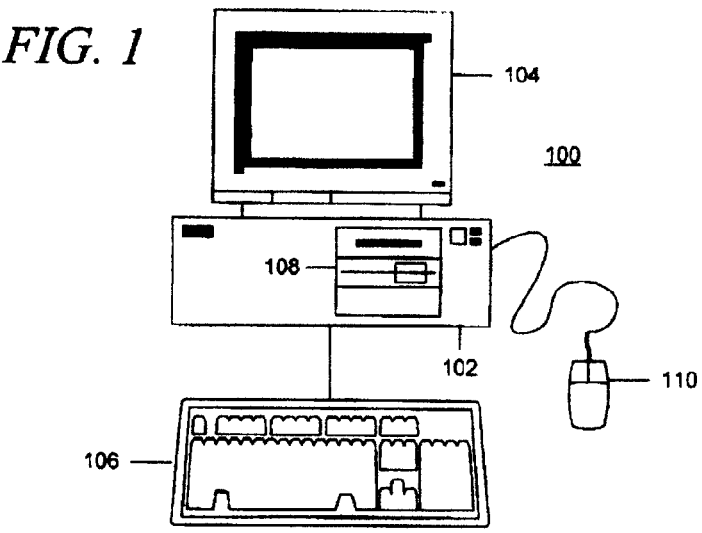
FIG. 1 is a pictorial representation of a data processing system in which the aspects of the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer-usable or computer readable storage medium may be utilized. The computer-usable or computer-readable storage medium may be, for example but not limited to, an electronic, magnetic, optical, electromagnetic, infrared, or semiconductor system, apparatus or device. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a pictorial representation of a data processing system in which aspects of the present invention may be implemented. A computer 100 includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 may be implemented using any suitable computer. Although the depicted representation shows a personal computer, exemplary aspects of the present invention may be implemented in other types of data processing systems, such as laptop computers, handheld computers, network computers, servers, workstations, cellular telephones and similar wireless devices, personal digital assistants and other electronic devices on which software programs may be installed. Computer 100 also preferably includes a graphical user interface (GUI) that may be implemented by means of systems software residing in computer readable media in operation within computer 100.

Figure 2:
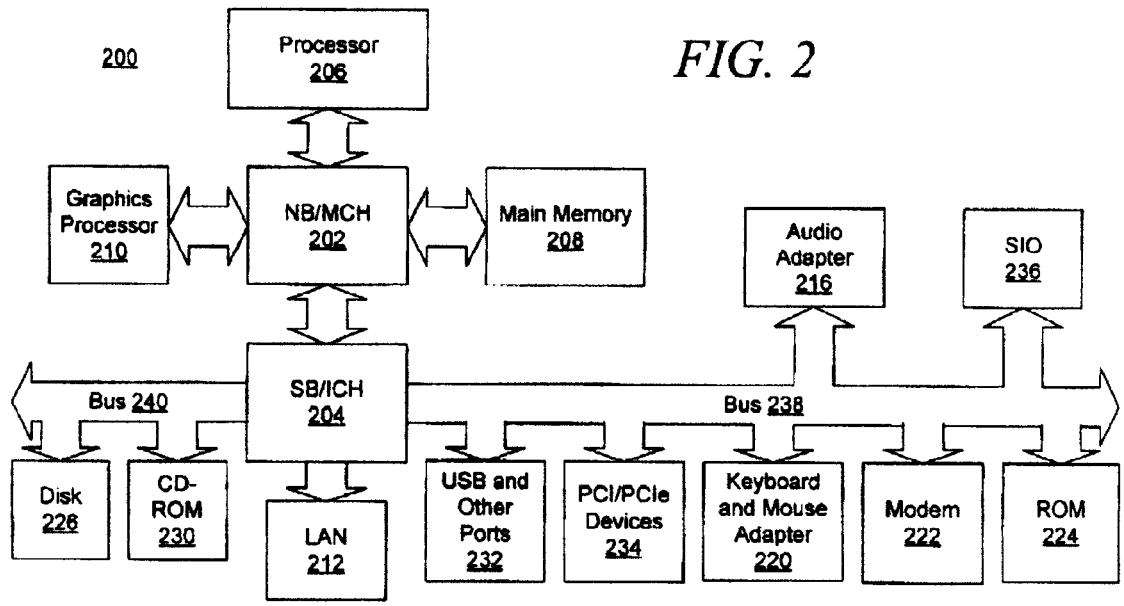
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as personal computer 100 in FIG. 1, in which code or instructions implementing the processes of the exemplary aspects may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH 202 through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 connect to south bridge and I/O controller hub 204 through bus 238. Hard disk drive (HDD) 226 and CD-ROM drive 230 connect to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter.

An operating system runs on processor 206 and coordinates and provides control of various components within data processing system 200 in FIG. 2. The operating system may be a commercially available operating system. An object oriented programming system may run in conjunction with the operating system and provides calls to the operating system from programs or applications executing on data processing system 200.

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the present invention may be applied to a multi-processor data processing system.

In some illustrative examples, data processing system 200 may be a personal digital assistant (PDA), which may be configured with flash memory to provide non-volatile memory for storing operating system files and/or user-generated data. A memory may be, for example, main memory 208 or a cache such as found in north bridge and memory controller hub 202. A processing unit may include one or more processors. The depicted examples in FIGS. 1 and 2 and above-described examples are not meant to imply architectural limitations. For example, data processing system 200 also may be a tablet computer, laptop computer, or telephone device in addition to taking the form of a PDA. There are a wide variety of different data processing systems capable of using computer programs. Accordingly, as used herein, the term "data processing system" is intended to have a broad meaning, and may include personal computers, laptop computers, handheld computers, network computers, servers, mainframes, workstations, cellular telephones and similar wireless devices, personal digital assistants and other electronic devices on which computer software may be installed. The terms "computer", "computer software", "computer code", "code", "computer program", "computer programming", "software", "software program" and related terms are intended to have a similarly broad meaning.

Modifications that are made to computer code while the code is being executed in a multi-threaded environment can be divided into three categories: Type 1 modifications, which are single-site modifications where all threads that elect to modify that site within the code will make the same change and the change can be made atomically; Type 2 modifications, which are dependent sequence modifications, where each thread will make a different modification and the sequence of modifications must be maintained; and Type 3 modifications, which are modifications that do not fit within the previous two categories. In each of the above cases, the code to be modified may be identified by some thread reaching a code address that requires modification before correct execution, or some other mechanism may trigger a thread to select a particular code location for modification. The particular means by which code at a particular address is identified to be modified is not relevant to the present invention.

Aspects of the present invention, as applied to each of the above categories of code modification during execution in a multi-threaded environment, will now be discussed.

Type 1: Single-Site Modification where all Threads Make the Same Modification

One example of a single-site modification where all threads would make the same modification is completing the dynamic resolution of a field offset in a memory reference for a language where the offset of a field may not be known at compile time. Because the field is at a constant offset from the beginning of the object that holds the field, any thread that resolves the field offset will discover that the field is at the same offset and will write the same offset into the memory reference instruction that accesses that field. Another example of a single-site modification where all threads would make the same modification is resolving a static/global variable address, since the address is a constant for all threads. In all cases, the modification is the same size as the word size of the processor, so that the store instructions that make the modification can be arranged to be atomic.

It will be appreciated that the common feature of the case where there is a single site requiring modification, and each thread would make the same modification, is that such modifications are idempotent operations, that is, repeated applications of the operation have the same effect as a single application. Therefore, if more than one thread makes the relevant modification to that site in the code, the correctness of the code will not be affected, since the same modification will be made each time.

Figure 3:
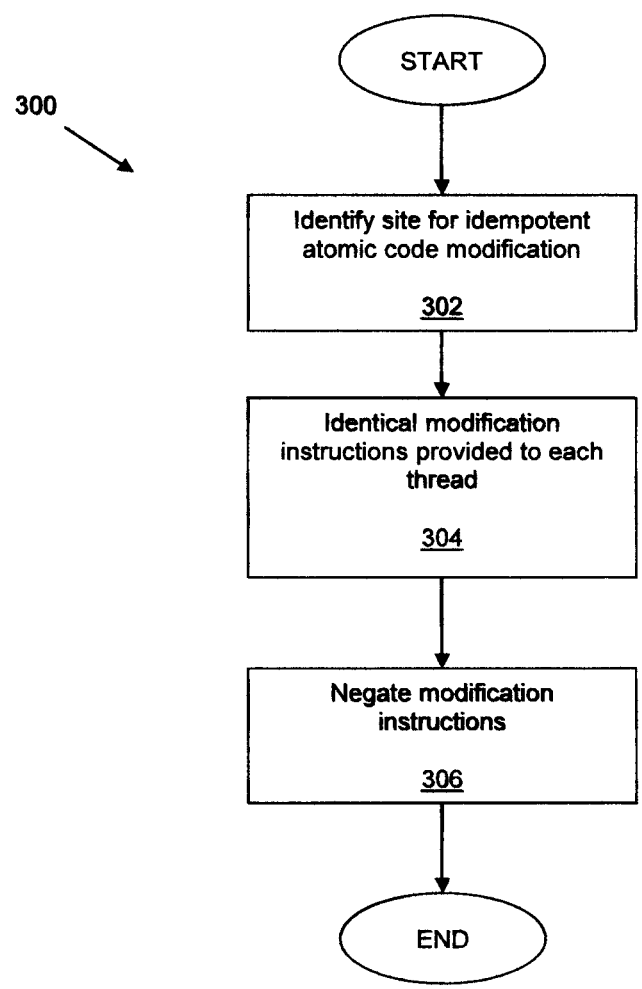
FIG. 3 is a flow chart showing a first method for modifying a code region forming part of a computer program during execution of the computer program by a plurality of threads according to an aspect of the present invention.

With reference now to FIG. 3, a method for modifying a code region forming part of a computer program during execution of the computer program by a plurality of threads, according to an aspect of the present invention, is shown generally at 300. At step 302, one or more threads will identify a site having a desirable idempotent atomic modification. The code region will be generated so as to enable the one or more threads to identify the site for modification. As noted above, the particular manner in which the site for modification is identified does not form part of the present invention. At step 304, each thread receives identical modification instructions. More particularly, these instructions are included when the code region is initially generated, and are provided to the threads in the sense that any thread reaching the code region or reaching instructions associated with the code region, will receive the modification instructions. Preferably, a call to the predefined modification instructions is embedded in the code region, so that an arbitrary thread will be provided with the modification instructions when it reaches and executes the call.

The modification instructions direct each thread to make the desirable idempotent atomic modification for the site identified at step 302. Although all of the threads receive the same modification instruction even if there are multiple threads performing the modification at the same time, all of them will write the same value into the site in the code region. There is no danger that some thread will see an inconsistent value because there is only a single site that needs to be updated. At step 306, once the modification has been made, the modification instructions are negated (since the code has already been modified). More particularly, the code region will be designed so that after it has been successfully modified by one thread, although other threads (if any) in flight will complete their (idempotent) modifications, subsequent threads that execute to this point in the program will not identify any need to perform modifications to the code region, and will execute the code region as previously modified. Thus, the instructions are adapted so that, responsive to completion of the desirable idempotent atomic modification, the call is negated. After step 306, the method ends.

Because, in the case of a single-site modification where all threads would make the same modification, the instruction stream must be updated atomically (i.e. other threads must see either the state of the instruction stream before the modification or that state after the complete update), one extra step may be required when the code that will be modified is originally generated to guarantee that the update can be done atomically.

Many processors have "patching boundaries", that is, code addresses across which it is not possible to perform an atomic store, that arise from the internal design of the processor. If a store is attempted that crosses a patching boundary, it is possible for another processor to observe only a part of the modification (either the part up to the patching boundary, or the part following the patching boundary). For thread safety, it is imperative that no site that must be modified be situated such that the site crosses a patching boundary. Preferably, this requirement can be satisfied by inserting as many NOP (no operation) instructions as are needed so that the part of the instruction that needs to be modified does not cross a patching boundary.

For example, consider this 6-byte load instruction from the Intel® IA32 architecture:

| Address | Instruction Bytes | Assembler Instruction |
|---------|-------------------|----------------------|
| 0xb75   | I1 I2 00 00 00 00 | mov edi, dword ptr[0x0] |

(Intel is a registered trademark of Intel Corporation or its subsidiaries in the United States and other countries.) The instruction noted above resides at address 0xb75, and is represented by the sequence of six hexadecimal bytes "I1 I2 00 00 00 00". The 'I1' and 'I2' can be considered opcode bytes, that specify: that the instruction is a load-from-memory instruction; that the destination for the value read from memory is to be a register called "edi" and; and that the addressing mode is a 32-bit absolute address specified in the instruction itself. The address of the memory location to load from is initially set to 0x0 because, when this code was generated, the location of the variable was not known. Before executing this code, however, the address is known. At that time, it is necessary to change the address in the load instruction to the address of the variable whose value this instruction is meant to read into the edi register.

Note that the 4 bytes that need to be updated are located starting at address 0xb77. In precise detail:

| Address | Byte |
|---------|------|
| 0xb75   | I1   |
| 0xb76   | I2   |
| 0xb77   | 00   |
| 0xb78   | 00   |
| 0xb79   | 00   |
| 0xb7A   | 00   |

Suppose the variable whose value is to be loaded is stored at address 0xAABBCCDD. After the load instruction has been modified, it should look like:

| Address | Instruction Bytes | Assembler Instruction |
|---------|-------------------|----------------------|
| 0xb75   | I1 I2 DD CC BB AA | mov edi, dword ptr[0xAABBCCDD] |

Note that Intel architectures store values in little-endian order, which is why the address 0xAABBCCDD appears as "DD CC BB AA" in the instruction.

For some processors that implement the IA32 architecture, it is not possible to modify this instruction in a thread-safe way because, for those processors, every 8 bytes are a patching boundary. In particular, that means that 0xb78 is a patching boundary. Since the 4 bytes that must be updated straddle the patching boundary, they cannot be updated atomically. Even if the modifying thread performs a single 4-byte store of the appropriate value, other threads may try to execute:

| Address | Instruction Bytes | Assembler Instruction |
|---------|-------------------|----------------------|
| 0xb75   | I1 I2 DD 00 00 00 | mov edi, dword ptr [0x000000DD] |

The three 00 bytes are shown in underlined bold to signify that these bytes follow the patching boundary at 0xb78.

Alternatively, other threads may try to execute:

| Address | Instruction Bytes | Assembler Instruction |
|---------|-------------------|----------------------|
| 0xb75   | I1 I2 00 CC BB AA | mov edi, dword ptr[0xAABBCC00] |

This problem can be prevented by using NOP insertion to align the 4 bytes that must be modified such that they do not cross a patching boundary. In the example being considered, only a single-byte NOP instruction (90) is needed to accomplish the alignment:

| Address | Instruction Bytes | Assembler Instruction |
|---------|-------------------|----------------------|
| 0x075   | 90                | NOP                  |
| 0xb76   | I1 I2 00 00 00 00 | mov edi, dword ptr[0x0] |

Note that the 4-byte field now begins at address 0xb78 and all 4 bytes appear between two adjacent patching boundaries (0xb78 and 0xb80):

| Address | Byte |
|---------|------|
| 0xb76   | 90   |
| 0xb77   | BF   |
| 0xb78 | 00 |
| 0xb79 | 00 |
| 0xb7A | 00 |
| 0xb7B | 00 |

As before, the four 00 bytes are shown in underlined bold to signify that these bytes follow the patching boundary at 0xb78.

Different processors define their patching boundaries differently, and these boundaries are rarely documented in architecture guides. To learn the patching boundaries, a developer must either contact the processor vendor or construct a test to determine what the boundaries are. The construction of such a test, in light of the disclosure herein, is within the capability of one skilled in the art.

Once the instruction is generated at a properly aligned address, for example by using NOP instructions as illustrated above, then all threads that want to update the value in the instruction can proceed to store the updated value without thread safety concerns. It will be appreciated that the NOP insertion is carried out when the code segment is initially generated. After the value has been updated, the instruction to update the value is negated in that no subsequent threads will be directed to update the address of the memory location in the 'mov' instruction.

Type 2: Dependent Sequence of Modifications

There are a number of instances where the sequence in which modifications are applied to a portion of code must be maintained, that is, if the threads apply the modifications in the wrong order, the resulting code may not be correct. One example of a modification that would fall into this category is a global counter stored in an instruction that might be incremented by any number of threads simultaneously and no thread's increment can be missed.

When the sequence of modifications must be maintained, the safest solution is to employ a lock which supports priority inheritance. This solution is not highly performant, but it will inhibit live lock from occurring while threads are performing the required modifications. Fortunately, circumstances in which the order of modification must be maintained are rare.

Type 3: All Other Modifications

This category includes all multi-site atomic modifications (i.e. where there are several sites in the code segment that must be modified and other threads must either execute the code with no modifications applied or with all modifications applied), and modifications that are thread-dependent but where it does not matter which particular thread performs the modification (as long as some thread does). In the latter case, once the modification is performed by one thread, all other threads should no longer attempt to make a modification. It will be appreciated that a single "modification", as that term is used herein, may comprise a plurality of individual changes to the code region.

An example of this third category of modification is initializing a cache where a particular value is looked for, and a particular function is called if that value appears. A more specific example would be a cache that accelerates virtual method invocations for a particular class of objects. Such a method invocation may be implemented as a small cache:

| Label | Address | Instruction Bytes | Assembler Instruction |
|-------|---------|-------------------|----------------------|
|       |         |                   | mov ebx, <receiver class> |
|       | 0x00    | I1 I2 CC CC CC CC | cmp ebx, 0xCCCCCCCC |
|       | 0x06    | I3 09             | jne generalCall (+9) |
|       | 0x08    | I4 T1 T1 T1 T1    | call <specific target> |
|       | 0x0D    | I5 08             | jmp continue (+8) |
| Datapool: | 0x0F | I1 I2             | dd <1$^{st}$ 2 bytes of 'cmp ebx'> |
| generalCall: | 0x11 | I6 I7 b4 ff ff ff | call [ebx-0x4c] |
| continue: | 0x17 |                   |                      |

In this cache, sometimes called a Polymorphic Inline Cache (PIC), if the target in the cache needs to be changed, then both the receiver class it looks for (0xCCCCCCCC) and the specific target corresponding to that class must be modified atomically. That is, it would be incorrect for another thread to see only the new class and then call an unmodified target, or see the unmodified receiver class and call the modified target. If multiple threads all try to change the values in the cache, it is imperative that only one thread succeed in changing both the receiver class and the target.

The cache described above also includes a general call that performs an additional load from the receiver class to do a full virtual invocation. The particular details of this additional load are not relevant to the present invention, but it should be noted that this general call provides an alternative execution path by which any receiver class (even the particular class being looked for in the cache) can be properly handled, although perhaps with lower performance.

Figure 4:
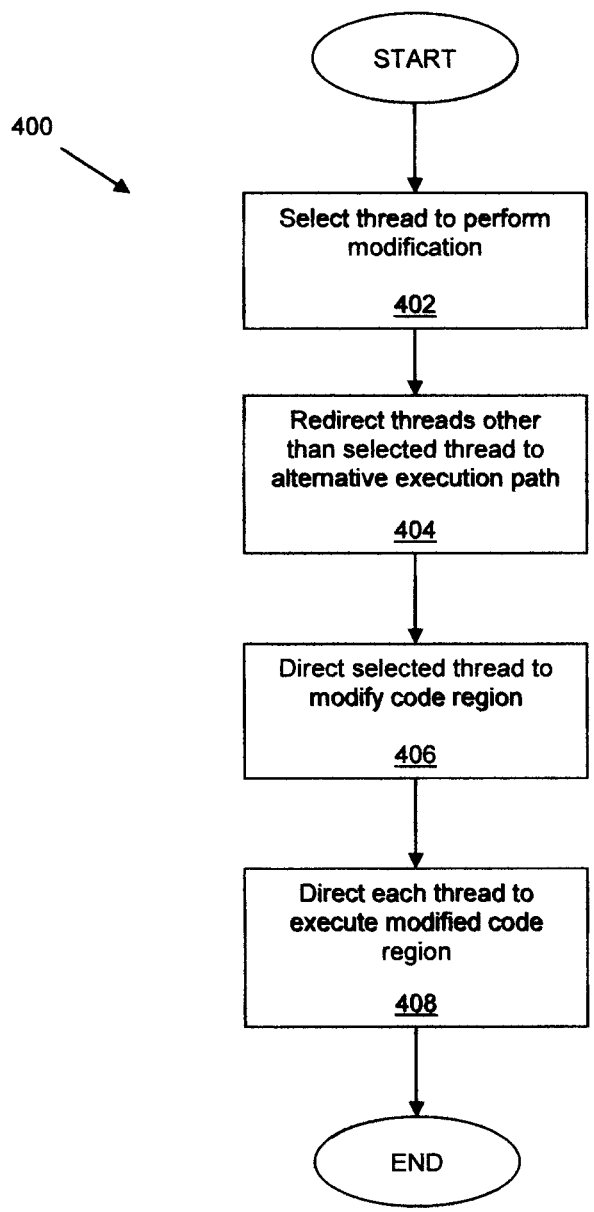
FIG. 4 is a flow chart showing a second method for modifying a code region forming part of a computer program during execution of the computer program by a plurality of threads according to an aspect of the present invention.

With reference now to FIG. 4, a second method for modifying a code region forming part of a computer program during execution of the computer program by a plurality of threads, according to an aspect of the present invention, is shown generally at 400. At step 402, the method selects a thread to modify the code region; it is this selected thread that will perform the desired modification. The selected thread may be chosen arbitrarily. At step 404, each thread other than the selected thread is directed to execute an alternative execution path that produces identical output to the code region after the modification has been performed, that is, the output of the alternative execution path is identical to what the output of the code region will be after it has been modified. In the cache example noted above, this alternative execution path is the general call. At step 406, the selected thread is directed to carry out the desired modifications to the code region. At step 408, after completion of the modification of the code region by the selected thread to generate a modified code region, each thread is directed to execute the modified code region. The redirection at step 404 should occur before the selected thread is directed to modify the code region; thus, any thread (other than the selected thread) that attempts to execute the code region while the selected thread performs the modification will be (temporarily) redirected to the general call. In one embodiment, steps 402 and 404 of the method 400 are carried out by performing a small atomic update (or a sequence of atomic updates) which have the effect of arbitrarily selecting a thread and redirecting the other threads to an alternative code path.

Preferably, a predefined set of instructions for carrying out steps 404 (redirecting threads other than the selected thread), 406 (making of modifications by the selected thread) and 408 (directing the threads to execute the modified code region) is provided when the code region is initially generated. A call to these predefined instructions is preferably included in the code region when the region is created, so that whichever thread reaches the call first will become the (arbitrarily) selected thread. Accordingly, one method by which a thread may be selected is for a point (such as a call to a set of instructions, or an embedded instruction set) to be associated, at code generation time, with the code region to be modified. The point may be included within the code region, or may be otherwise associated therewith (for example within a snippet or a runtime function called from within the code region). The point is positioned so that any thread executing the program will have access to the point through the normal course of program execution, and is designed so that an arbitrary first thread to reach the point becomes the selected thread (for example, by execution of certain instructions that redirect the other threads).

In the particular example of the cache shown above, an initial small atomic update is accomplished via an atomic compare-and-swap to change the 'cmp' instruction into a 'jmp' instruction. On a processor implementing the Intel IA32 architecture, the jmp instruction requires 2 bytes whereas the cmp instruction occupies 6 bytes. That means only the first 2 bytes of the compare instruction are actually modified. To facilitate this update, the first two bytes of the compare instruction are also embedded at the Datapool label in an unexecuted section of the code. The first two bytes of the 'cmp' instruction encode the opcode for the instruction (the fact that a comparison is desired) and the operand descriptions (first operand is in the register ebx, second operand is stored in memory). If these two bytes are constant for all caches, i.e. if the receiver class is always stored in a particular register, for example, then the data pool would not be necessary since any thread could create the values for those two bytes without loading them from the site to be modified. If, however, the receiver class might appear in any register, then the preferred approach is to store the first two bytes in the cache, as shown above, so that they can be loaded by any thread that seeks to modify the code.

If there are multiple threads, then only one of those threads will be able to atomically read the bytes for a 'cmp' instruction and replace them with a 'jmp' instruction. The offset in the instruction stays the same. The thread that changed the 'cmp' into a 'jmp' proceeds to perform the modification of the cache. Other threads that try and fail to do the atomic compare-and-swap should not perform the modification.

This particular atomic update accomplishes steps 402 and 404 in the required order. Only one thread can perform the atomic update and so a single thread is selected to perform the full modification. All other threads that try to execute the code will be directed towards the general call, and the new 'jmp' instruction will redirect execution before the earliest part of the modification, namely the class pointer stored in the original 'cmp' instruction.

After this small atomic update, the code region will be as shown in the following table:

| Label | Address | Instruction Bytes | Assembler Instruction |
|---|---|---|---|
| | 0x00 | EB 0E | jmp +15 |
| | 0x02 | CC CC CC CC | dd 0xCCCCCCCC |
| | 0x06 | I3 09 | jne generalCall (+9) |
| | 0x08 | I4 T2 T2 T2 T2 | call <a different specific target> |
| | 0x0D | I5 08 | jmp continue (+8) |
| Datapool: | 0x0F | I1 I2 | dd <1st 2 bytes of 'cmp ebx'> |
| generalCall: | 0x11 | I6 I7 b4 ff ff ff | call [ebx-0x4c] |
| continue: | 0x17 | | |

At this point, all of the code between offsets 0x02 up to 0x0F can be modified without the risk of undesirable interactions among multiple threads. In particular, a specific class pointer and its corresponding target can be written (by the selected thread) at offsets 0x02 and 0x09, respectively. Any thread other than the selected thread that attempts to execute the code region while the selected thread is making the modifications will be redirected (in this example, by the 'jmp' instruction). The (arbitrarily) selected thread can then carry out the modification, thereby completing step 406.

After the desired modifications have been performed (in this example, writing a specific class pointer and its corresponding target), it will be safe for threads other than the selected thread to execute the modified code region. Accordingly, the 'jmp' instruction can be replaced with the original 2 bytes of the 'cmp' instruction, which can be loaded from the Datapool label. Once the 'cmp' instruction has been restored, the code modification is complete, and the modified code region will appear as shown in the table below:

| Label | Address | Instruction Bytes | Assembler Instruction |
|---|---|---|---|
| | 0x00 | I1 I2 DD DD DD DD | cmp ebx, 0xDDDDDDDD |
| | 0x06 | I3 09 | jne generalCall (+9) |
| | 0x08 | I4 T2 T2 T2 T2 | call <specific target> |
| | 0x0D | I5 08 | jmp continue (+8) |
| Datapool: | 0x0F | I1 I2 | dd <1st 2 bytes of 'cmp ebx'> |
| generalCall: | 0x11 | I6 I7 b4 ff ff ff | call [ebx-0x4c] |
| continue: | 0x17 | | |

As shown in the above table, after completion of the modification of the code region by the selected thread to generate a modified code region, each thread is directed to execute the modified code region, completing step 408.

It need not be the case that the alternative execution path (providing an alternate path for the non-selected threads) exists when the code is first generated, although where such a path exists, using this existing path is generally preferred. The main factor that must be considered in deciding whether to use an existing alternative path is how well the instruction set supports branch instruction modification. On the IA32 architecture, for example, branches with a target less than 128 bytes away can be atomically patched with a 2-byte store. Branches that are further away are 5-byte instructions, that can only be atomically patched via a very expensive atomic 8-byte compare-and-exchange instruction requiring 3 bytes of adjacent instructions to be known (and likely not themselves modifiable) in order to carry out the correct modification. Therefore, while having a nearby alternative execution path to serve as an alternative path for non-selected threads is the best option from a code modification point of view, closeness is not always feasible, nor is it always the best option in terms of performance when the code is not often modified.

Code "snippets", that is, small sections of code located away from the region of code to which they relate, are often used to facilitate code modification so that a sequence of instructions that will be rarely used (to carry out code modification) does not impact the typical execution path. One example might be the resolution of a static field/global variable, as mentioned earlier in this document. The traditional approach to resolve the field was to use a snippet to encode information about which field/variable needs to be resolved and to call a runtime routine to perform the actual resolution and modify the actual memory reference instruction. Because the resolution path, that is, the code that is executed to resolve the variable, only needs to execute once, keeping this code in the snippet leaves the typical execution path cleaner because there are fewer branch-arounds to avoid executing the code used to resolve the variable after the variable has been resolved. The problem is that the snippet is rarely close-by, because of the desire to keep the snippet from interfering with code layout for the more often executed mainline code stream.

Consider the following instruction representing an unresolved reference to a static variable, as shown in the table below:

| Address | Instruction Bytes | Assembler Instruction |
|---|---|---|
| 0xB76 | I1 I2 00 00 00 00 | mov ebx, dword ptr[0x0] |
| 0xB7C | | |

A snippet of code would be generated near the end of the code region, substantially as shown in the table below:

| Address | Instruction Bytes | Assembler Instruction |
|---|---|---|
| 0xE04 | I1 AA AA AA AA | push 0xAAAAAAAA |
| 0xE09 | I2 BB BB BB BB | push 0xBBBBBBBB |
| 0xE0E | I3 T1 T1 T1 T1 | Call resolveAndPatchStaticField |
| 0xE13 | I4 T2 T2 T2 T2 | jmp 0xB7C |

In the exemplary code snippet shown in the table above, 0xAAAAAAAA and 0xBBBBBBBB are values that describe which static field is to be resolved.

To cause the resolution to occur at runtime when the memory reference instruction at 0xB76 is first executed, the actual memory reference instruction is not initially generated. Instead, a call to the snippet is generated in its place, as shown in the table below:

| Address | Instruction Bytes | Assembler Instruction |
|---|---|---|
| 0xB76 | I11 88 02 00 00 | call 0xE04 |
| 0xB7B | 00 | db 00 |
| 0xB7C | | |

In this particular case, the original memory reference instruction is 6 bytes long whereas the call to the snippet is only 5 bytes long. The extra 0 byte (at address 0xB7B in the table above) is also generated so that there is enough space to write the memory reference instruction when it is finally resolved.

Aspects of this code have been omitted for brevity, such as where the memory reference appears in the memory reference instruction and how the snippet can construct the memory reference instruction bytes I1 and I2. These aspects will, in view of the disclosure herein, be apparent to one skilled in the art, and are not relevant to the present invention.

Inside the runtime function 'resolveAndPatchStaticField' is a sequence of instructions whose object is to overwrite the call instruction at 0xB76 with the two instruction bytes I1, I2, and to write the address of the static field into the four bytes at 0xB78. According to the traditional approach, this is accomplished by first modifying the instruction at 0xB76 by storing a two-byte self-loop instruction (jmp-2 or 'I12 FE' in the example code below). This instruction is a self loop (a "spin loop") that prevents other threads from getting in the way while the rest of the instruction is modified. After inserting the spin loop instruction, the instruction stream will be as shown in the table below:

| Address | Instruction Bytes | Assembler Instruction |
|---|---|---|
| 0xB76 | I12 FE | \| jmp −2; |
| | - - Self | Loop - - |
| 0xB78 | 02 00 00 00 | dd 00000002 |
| 0xB7C | | |

After the self-loop has been written, the four bytes following the loop at 0xB78 can be safely written by a given thread without another thread executing them because any other thread reaching this code will repeatedly execute the self-loop and will therefore not reach the code being modified. The four bytes following the loop at 0xB78 correspond to the address of the static field (referred to in this example by the notation 0xDDDDDDDD), and can be safely written as shown in the table below:

| Address | Instruction Bytes | Assembler Instruction |
|---|---|---|
| 0xB76 | I12 FE | \| jmp −2; |
| | - - Self | Loop - - |
| 0xB78 | DD DD DD DD | dd DDDDDDDD |
| 0xB7C | | |

After the four bytes corresponding to the address of the static field have been written, the self-loop can be replaced with the first two bytes of the memory reference instruction, namely I1 and I2. Upon completion of this step, the instruction stream will be substantially as shown in the table below:

| Address | Instruction Bytes | Assembler Instruction |
|---|---|---|
| 0xB76 | I1 I2 DD DD DD DD | \| mov ebx, dword ptr[0xDDDDDDDD] |
| 0xB7C | | |

Certain processors may require memory barriers to cause the address of the static field to be seen before the self-loop is removed; in the absence of such memory barriers a processor may observe the instruction "I1 I2 00 00 00 00", which would be incorrect.

The example outlined above so far employs the traditional approach of using a self-loop, that is, a spin loop, as a "patch" to prevent threads other than the thread that is modifying the code from executing the code while it is being modified. As noted above, the use of a spin loop introduces the possibility of a "live lock" where a low priority thread writes the spin loop and is then prevented from completing the modification by a higher priority thread that subsequently becomes stuck in the spin loop.

With reference to the earlier example, it should be appreciated that the resulting instruction stream is the same as what would have been generated if the address of the static field had been known when the unmodified code was originally generated. There is a tradeoff in that the code generated according to an aspect of the present invention which addresses the live lock problem, and which contains the resolved field address, will not be quite as efficient as the code generated by the traditional approach using a spin loop. Effectively, some efficiency is traded in exchange for avoiding the possibility of a live lock situation.

According to an aspect of the present invention, rather than overwriting the memory reference instruction with the call to the snippet, the snippet call is explicitly generated in front of the memory reference instruction, as shown in the table below:

| Address | Instruction Bytes | Assembler Instruction |
|---------|-------------------|-----------------------|
| 0xB71   | I0 8e 02 00 00    | call 0xE04            |
| 0xB76   | I1 I2 00 00 00 00 | mov ebx, dword ptr[0x0] |
| 0xB7C   |                   |                       |

The code snippet used is identical to the snippet that would be used in the traditional spin loop approach as described above; however the resolveAndPatchStaticField runtime function performs a slightly different sequence of instructions to modify the code once the field's address is resolved. This modification is a Type I modification (as defined herein) because all threads will resolve the field to the same address, that is, resolution of the field address is a desirable idempotent atomic modification for that site in the code region. Therefore, according to an aspect of the present invention, identical modification instructions are provided to each thread in the form of the call to the code snippet. More precisely, while there is only one copy of the instructions, this copy is provided to each thread because it is available for execution by any arbitrary thread that reaches it, and it is possible for multiple threads to execute the instructions simultaneously since more than one thread may execute the call at the same time. These modification instructions, via the code snippet itself, direct each thread to make the desirable idempotent atomic modification. In some embodiments, to improve performance when many threads reach the code region simultaneously, each thread will first read the instruction to be modified and examine it to determine whether the modification has already been made. If the instruction read has already been modified, then no further modification need be made. Even though such modification would be idempotent and would not change the correctness of code region, writing to the instruction may have a negative performance impact in a computer system employing multiple cache memories. By not performing the modification when it is detected that the modification has already occurred, such embodiments avoid this negative performance impact. Thus, the modification instructions would include a directive such that each thread reaching the instructions would first check whether another thread has already made the desirable idempotent modification, and, if the modification has been made, the thread would not attempt to "re-make" it. Thus, in one embodiment, the modification instructions are adapted so that, responsive to completion of the desirable idempotent atomic modification, the modification instructions are negated.

Therefore, all threads will be allowed to call the snippet which will call the runtime function. All threads (or, in the embodiment in which each thread checks whether the modification has been made, the first thread) will resolve the address to 0xDDDDDDDD and will then write that address into the instruction stream at 0xB78, as shown in the table below:

| Address | Instruction Bytes | Assembler Instruction |
|---------|-------------------|-----------------------|
| 0xB71   | I0 8e 02 00 00    | call 0xE04            |
| 0xB76   | I1 I2 DD DD DD DD | mov ebx, dword ptr[0xDDDDDDDD] |
| 0xB7C   |                   |                       |

Once the address has been resolved and written into the instruction at 0xB78, other threads should subsequently be prevented from calling the code snippet, since the field has already been resolved and the instruction modified, and while repeated execution of the snippet would not produce an incorrect result, such repeated execution would be inefficient. Accordingly, in response to completion of the desirable idempotent atomic modification, in this case resolution of the address, the identical modification instructions are negated. To negate these instructions so that other threads do not call the code snippet after the address has been resolved, the 5-byte call instruction must be modified to be a 5-byte NOP instruction. This modification lends itself to application of an aspect of the present invention.

The 5-byte call instruction can be viewed as part of a code region which must be modified, in this case comprising the 5-byte call instruction and the preceding call to the snippet. Atomically writing the 8 bytes around the 5 bytes is expensive, so it is preferred to use a 3-step modification process to patch 5 bytes. This modification is actually a Type 3 modification (as defined herein), since only one thread can perform this 3-step process correctly; if multiple threads attempt to perform the modification simultaneously, incorrect code will likely result. Accordingly, the method 400 depicted in FIG. 4 may be used to effect the modification while preserving thread safety.

The first step in the 3-step process is to perform an atomic compare-and-swap on the first 2 bytes of the call instruction at 0xB71. The bytes to write over these first two bytes, namely 'I0 8e', are a 2-byte instruction: jump+3. A jump+3 instruction will cause other threads to jump directly to 0xB76 and execute the modified memory reference instruction, which, by the time any thread other than the selected thread reaches it, will have already been modified by execution of the code snippet by the selected thread. Thus, insertion of the jump+3 instruction corresponds to both steps 402 and 404 in the method 400, namely selecting a single thread to perform the modification as well as directing the threads other than the selected thread to execute the alternative execution path, respectively. Any thread that does not successfully replace "I0 8e" with "JMP+3" can return directly to execute 0xB76, since such failure indicates that another thread has been selected to change the call instruction into a 5-byte NOP instruction. The one thread that succeeds will modify the instruction stream as shown in the table below:

| Address | Instruction Bytes | Assembler Instruction |
|---|---|---|
| 0xB71 | JMP 03 | jmp  +3 |
| 0xB73 | 02 00 00 | db   000002 |
| 0xB76 | I1 I2 DD DD DD DD | mov  ebx, dword ptr[0xDDDDDDDD] |
| 0xB7C | | |

It will be apparent to one skilled in the art how the instruction bytes 'I0 8e' might be constructed or loaded from a memory location initialized during code generation.

For the second step of the 3-step modification, the selected thread can safely change the three bytes at 0xB73 to the last three bytes of a 5-byte NOP instruction (N3 N4 N5), as shown in the table below:

| Address | Instruction Bytes | Assembler Instruction |
|---|---|---|
| 0xB71 | JMP 03 | jmp  +3 |
| 0xB73 | N3 N4 N5 | db   N3 N4 N5 |
| 0xB76 | I1 I2 DD DD DD DD | mov  ebx, dword ptr[0xDDDDDDDD] |
| 0xB7C | | |

Finally, the third step in the 3-step process performed by the selected thread is to overwrite the JMP+3 instruction with the first two bytes of the 5-byte NOP instruction, as shown in the table below:

| Address | Instruction Bytes | Assembler Instruction |
|---|---|---|
| 0xB71 | N1 N2 N3 N4 N5 | NOP |
| 0xB76 | I1 I2 DD DD DD DD | mov  ebx, dword ptr[0xDDDDDDDD] |
| 0xB7C | | |

Any thread that executes this code will now perform a NOP first, which has very little cost, followed by the memory reference instruction. The second and third step in the 3-step modification process correspond to step 406 of the method 400, namely directing the selected thread to carry out the modification of the code region (and modification of the region by that thread). After the modification is complete, step 408 is completed as the threads are now directed to execute the modified code region, which comprises the NOP instruction and the memory reference instruction. In some embodiments, instructions that branch to this code region will now branch directly to the NOP instruction that was written over the call to the snippet. In other embodiments, such branch instructions may be modified so as to skip executing the NOP instruction and, instead, branch directly to the memory reference instruction. The method of making of such modifications will, in view of the disclosure herein contained, be apparent to one of ordinary skill in the art.

The use of a NOP operation in the modified code region represents a slight performance impact relative to the typical execution path resulting from the traditional spin loop technique described above, but with the mitigating benefit that the possibility of live lock while the code is modified has been averted.

In some cases, it may be preferred to generate the alternative execution path prior to the step of directing each thread other than the selected thread to execute that alternative execution path. An example would be a modification that specializes a particular code region, such as a static field reference being changed to load a constant value if the static field has been identified as never changing. In this case, the alternative code path could be generated by copying the existing static field reference instruction to a temporary location and then redirecting all threads but one to execute that copy of the static field load. A selected thread could then modify the static field reference instruction to change it into a constant load instruction, at which point the instructions to redirect threads to the alternative code path could be negated, which could itself be a code modification, as described in an earlier example.

Figure 5:
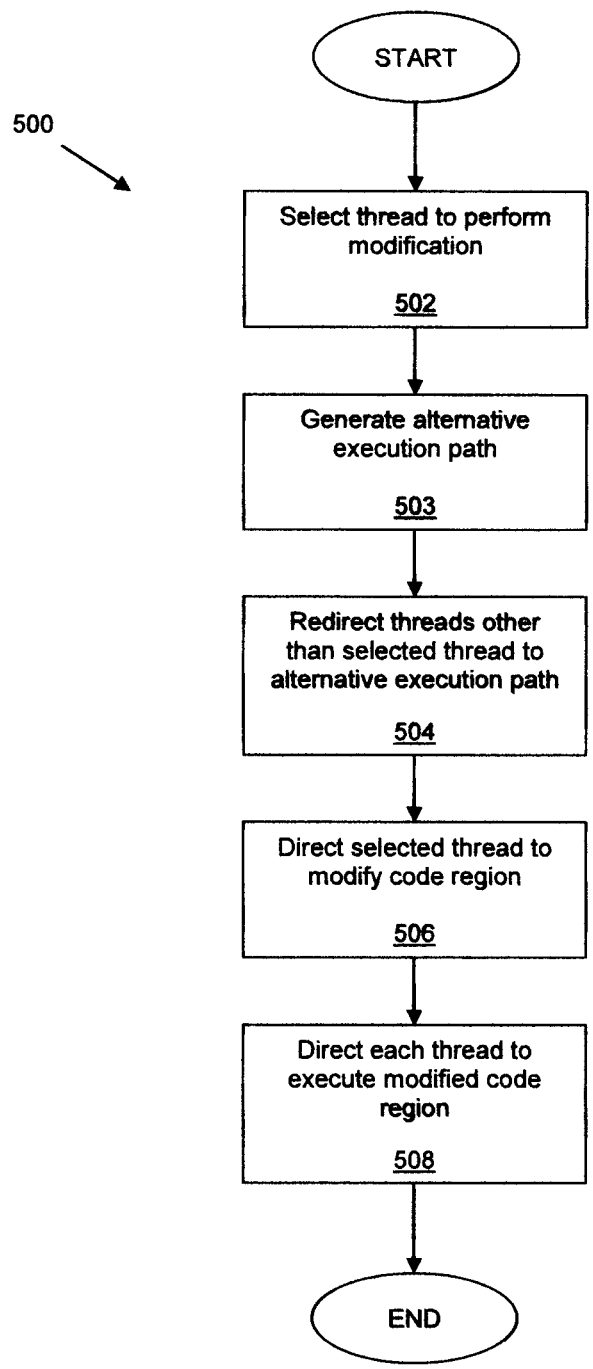
FIG. 5 is a flow chart showing a third method for modifying a code region forming part of a computer program during execution of the computer program by a plurality of threads according to an aspect of the present invention.

With reference now to FIG. 5, a method according to an aspect of the present invention, in which the alternative execution path is generated prior to the step of directing each thread other than the selected thread to execute that alternative execution path, is shown generally at 500. At step 502, the method selects a thread to modify the code region. As was the case in the method 400, it is this selected thread that will perform the desired modification, and the selected thread may be chosen arbitrarily. At step 503, the method generates the alternative execution path. It will be within the capability of one skilled in the art, having been further informed by the disclosure contained herein, to develop means for generating suitable alternative execution paths. At step 504, each thread other than the selected thread is directed to execute the newly generated alternative execution path, which generates output identical to the output that will be generated by the code region once it has been modified. At step 506, analogously to step 406 in the method 400, the selected thread is directed to carry out the desired modifications to the code region. At step 508, after completion of the modification of the code region by the selected thread to generate a modified code region, each thread is directed to execute the modified code region.

Analogously to the method 400, a predefined set of instructions for carrying out steps 503 (generating the alternative execution path), 504 (redirecting threads other than the selected thread), 506 (making of modifications by the selected thread) and 508 (directing the threads to execute the modified code region) is preferably provided when the code region is initially generated. A call to these predefined instructions is preferably included in the code region when the region is created, so that whichever thread reaches the call first will become the (arbitrarily) selected thread.

Advantageously, as indicated above, instructions can be inserted into the code region when it is generated, which instructions will, when the computer program containing the code region is executed, cause an appropriate one of the methods described herein to be carried out so as to effect the desirable runtime modification of the code region.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer program product comprising at least one computer-usable storage medium having computer-usable program code for making a desirable modification to a site in a code region forming part of a computer program during execution of the computer program by a plurality of threads, the computer program product comprising:
   computer-usable program code for providing identical modification instructions to each thread for modifying the site in the code region, wherein the modification instructions direct each thread to make the desirable modification, without use of a self-loop, using an idempotent atomic instruction, wherein the idempotent atomic instruction is generated to ensure that the desirable modification does not cross a patching boundary by NOP insertion.

2. The computer program product of claim 1, wherein the computer-usable program code is adapted to negate the modification instructions in response to completion of the desirable modification.

3. A computer program product comprising at least one computer-usable storage medium having computer-usable program code for making a desirable modification to a code region forming part of a computer program during execution of the computer program by a plurality of threads, the computer program product comprising computer-usable program code for:
   selecting a thread to modify the code region;
   directing each thread other than the selected thread to follow an alternative execution path that generates output identical to output of the code region after the desirable modification has been made to the code region without use of a self-loop;
   responsive to directing each thread other than the selected thread, directing the selected thread to make the desirable modification to the code region so as to generate a modified code region; and responsive to completion of the desirable modification by the selected thread, directing each thread to execute the modified code region.

4. The computer program product of claim 3, further comprising computer-usable program code for generating the alternative execution path prior to directing each thread other than the selected thread to follow the alternative execution path.

5. The computer program product of claim 3, wherein the alternative execution path is a pre-existing general call associated with the code region.

6. The computer program product of claim 3, wherein the computer-usable program code for making the desirable modification is adapted for selecting the thread to modify the code region as an arbitrary first thread to reach a particular execution point associated with the code region.

7. A computer program product comprising at least one computer-usable storage medium having computer-usable program code for causing a desirable modification to be made to a site in a code region forming part of a computer program during execution of the computer program by a plurality of threads, the computer program product comprising computer-usable program code for:
   generating, as executable code in the code region, a call to a set of modification instructions, the modification instructions using an idempotent atomic instruction to make the desirable modification without use of a self-loop, so that each thread reaching the call will execute the idempotent atomic instruction, wherein the idempotent atomic instruction is generated to ensure that the desirable modification does not cross a patching boundary by NOP insertion.

8. The computer program product of claim 7, wherein the idempotent atomic instruction comprises a compare-and-swap instruction that executes successfully only on a first execution thereof, the first execution performing the desirable modification.

9. The computer program product of claim 7, wherein the modification instructions are adapted to negate the call responsive to completion of the desirable modification.

10. A computer program product comprising at least one computer-usable storage medium having computer-usable program code for causing a desirable modification to be made to a code region forming part of a computer program during execution of the computer program by a plurality of threads, the computer program product comprising computer-usable program code for:
   generating, as executable code in the code region, a call to a set of instructions that causes the desirable modification to be made without use of a self-loop; and
   generating, as the set of instructions, executable code that, when executed, performs:
   causing an arbitrary thread that executes the set of instructions to become a selected thread;
   directing each thread other than the selected thread to follow an alternative execution path that generates output identical to output of the code region after the desirable modification has been made to the code region;
   responsive to directing each thread other than the selected thread, directing the selected thread to make the desirable modification to the code region so as to generate a modified code region; and directing each thread to execute the modified code region in response to completion of the desirable modification by the selected thread.

11. The computer program product of claim 10, wherein the executable code generated as the set of instructions, when executed, further performs generating the alternative execution path before each thread other than the selected thread is directed to follow the alternative execution path.

12. The computer program product of claim 10, wherein the alternative execution path is a pre-existing general call associated with the code region.

13. The computer program product of claim 10, wherein the arbitrary thread is a first thread to reach the call.

* * * * *